April 12, 1955 SAKUJI YAMAGUCHI 2,706,233
WELDING ELECTRODES FOR HIGH FREQUENCY
ELECTRIC SEWING MACHINES
Filed Feb. 1, 1952
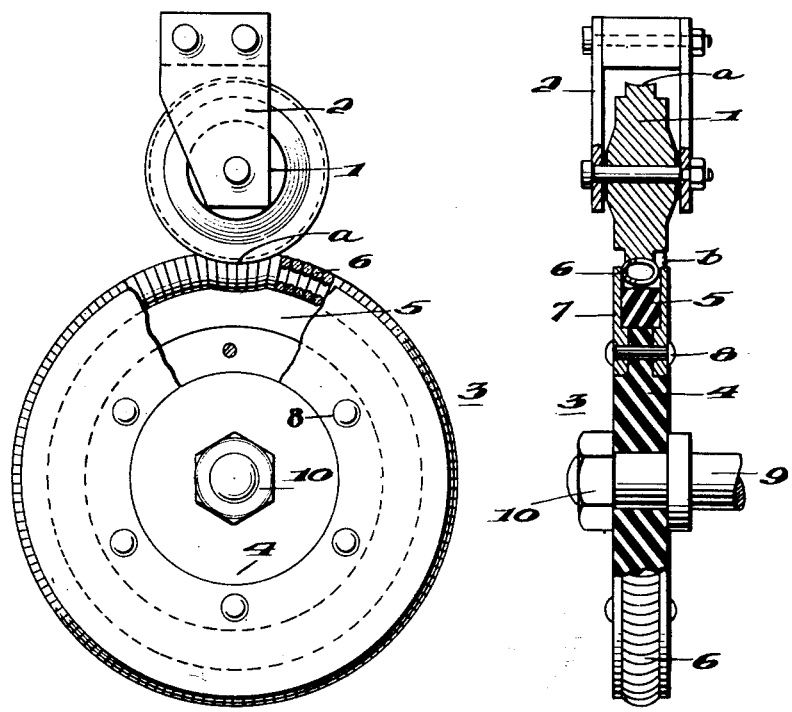
INVENTOR
SAKUJI YAMAGUCHI,
ATTORNEYS

United States Patent Office 2,706,233
Patented Apr. 12, 1955

2,706,233

WELDING ELECTRODES FOR HIGH FREQUENCY ELECTRIC SEWING MACHINES

Sakuji Yamaguchi, Nagoya City, Japan

Application February 1, 1952, Serial No. 269,357

Claims priority, application Japan February 8, 1951

4 Claims. (Cl. 219—10.53)

This invention relates to an improvement in welding electrodes adapted for use with high frequency electric sewing machines, and has for its object to provide a splendid welding electrode which can accomplish positive, high speed and continuous welding of thin sheets or cloth of dielectric substance such as vinyl resins and other plastic synthetic resins by applying thereto high frequency potential without danger of sparking or splitting the sheets.

It is known that the dielectric substance such as thin sheets or cloths of vinyl resins or synthetic resins can be welded together by applying thereto high frequency potential, and various contrivances have been devised for this purpose, and ordinary sewing machines are being displaced by high frequency electric sewing machines, i. e. high frequency welding machines. Among these welding machines, there are some which uses a pair of solid roller electrodes of different diameters in place of sewing needle device of an ordinary sewing machine. With such ordinary solid roller electrodes, the welding speed is low and impossible to raise higher than two meters per minute for thin vinyl chloride sheets. This is due to the point contact of ordinary solid roller electrodes in the direction of advancing the sheets. Moreover the welding is not positively and uniformly carried out owing to the uneven thickness of vinyl chloride sheets.

According to the present invention, the above disadvantages are overcome by using a specially constructed elastic deformable roller or ring electrode which cooperates with a solid roller electrode, thereby effecting always line or ribbon-like surface contact with the sheets to be welded so that the high frequency energy may act for longer time and effectively. It requires special arts in manufacturing elastic deformable electrode consisting of a spiral spring since the consecutive coils of the spring should make close contact with each other when the spiral spring is fitted around a circular disc. For this purpose, each coil of the spring should be carefully ground or otherwise finished in radial direction. Such closely and tightly contacting coiled spring can not only avoid the sparking and irregularity of welding but also enables the positive and high speed welding of vinyl chloride sheets.

For a better understanding of this invention, reference is taken to the accompanying drawing, in which Fig. 1 is an elevation of the electrode device embodying this invention; and Fig. 2 is a sectional side view of Fig. 1.

Now referring to Figs. 1 and 2, 1 designates an upper roller electrode made of metal such as copper or copper alloy having somewhat concave peripheral groove $a$ and both sides cut to smaller diameter for the purpose as hereinafter explained. The roller 1 is rotatably mounted to a frame 2 which may be fitted to the place of needle operating mechanism of an ordinary sewing machine by suitable means (not shown). 3 represents a lower electrode of larger diameter consisting of a circular disc 4 of insulating material preferably having the least loss for high frequency energy such as acryl resin, mica or ebonite, an intermediate ring 5 preferably of elastic rubber and the like material, and an elastic peripheral member 6 which is held in position by means of side plates 7 and rivets 8. The peripheral member 6 in the example shown in Figs. 1 and 2 is made of a closely coiled spiral spring preferably wound around an elliptical core. The spring may be made of phosphor bronze wire having circular or rectangular cross section. When a straight spring is bent the consecutive coils along the outer periphery will separate and cause gaps. It is necessary to make a spring having closely contacting coils when the spring is bent to a circular form. To accomplish this effect, each coil of the spring should be ground or otherwise finished in radial direction from the center of the circle. By this means, one can obtain a spirally coiled circular spring having consecutive coils in close contact around the periphery. This is one of the important features of the elastic deformable roller electrode for high frequency electric sewing (or welding) machine of this invention for effecting line or ribbon-like surface contact between electrodes and the dielectric sheets such as vinyl chloride or synthetic resin, thereby accomplishing positive and high speed welding without danger of spark-over or breaking the sheets. The thus constructed lower electrode 3 is secured to a driving shaft 9 by means of a nut 10 to be replaced when required.

The above described electrodes are mounted to a high frequency electric sewing machine and thin sheets of vinyl chloride as for instance are located between the electrodes and the lower electrode 3 is rotated by the shaft 9, then the upper roller 1 is turned and feeds the sheets in one direction. Thus the seam of sheets is welded together by the high frequency potential applied thereto. According to this invention, the spring 6 is deformed by the pressure applied to the upper roller 1 when it is pressed downwards and the electrodes make contact along the arc or ribbon-like surface so that it can consume sufficient energy for high frequency welding of dielectric sheets and can accomplish positive and high speed welding. The inventor has practically ascertained that thin sheets of vinyl chloride can be welded at a speed of ten meters per minute at a smaller power consumption and even the curved seam can be easily welded.

In ordinary electrodes of this kind consisting of a pair of solid rollers having different diameters, the contact between the electrodes is invariably a series of points along the direction of advance or lines normal to the direction of advance so that the welding can not be accomplished quickly and if the high frequency power is increased for increasing the welding speed there occurs the danger of burning the sheets. In order to avoid this, the wave length should be taken as short as possible, but the short wave energy accompanies the difficulties of causing oscillation. To safely increase the output of high frequency oscillation it requires a sufficient contact area. According to this invention, the elastic and deformable roller electrode has accomplished the above requirement and resulted in the positive and continuous welding at higher speed.

The upper smaller roller 1 has a specially formed concave central periphery $a$ to conform with and to make intimate contact with the outer surface of the spiral spring electrode 6, and one or both side edges of the roller 1 is finished to a smaller diameter leaving a clearance $b$ between the ridge of the larger electrode. This construction is useful for obtaining the positive welding all over the effective breadth without danger of spark-over and splitting the sheets along the edges of welding seam with less output. This is due to the fact that the high frequency waves tend to radiate more intensively along both edges of the effective breadth. But this effect can be suppressed by the leakage field passing through the gaps $b$ of smaller diameter portions so that the concentration of flux at both side edges of the effective breadth and the spark-over and the breaking of sheets can be avoided. If on the contrary the smaller electrode is made of a metallic roller with the effective breadth only and/or fitted with an insulating disc on the side, the high frequency fluxes are radiated most intensively at both edges of the contact part so that the sheets of plastic material may be split or there occurs spark-over as the sheets are pressed heavily and the positive welding is interrupted. The special construction of electrode together with the elastic electrode of this invention completely overcomes the above described danger and disadvantages.

Having thus described my invention, what I claim as new and desire to secure by Letters Patent of the United States is:

1. Welding electrodes for high frequency electric sewing machines which comprise an upper solid metallic roller electrode to be fitted to the sewing machine in place of a needle operating mechanism so as to move up-and-down, and a lower roller electrode arranged to be driven by a driving shaft of the machine, said lower electrode consisting of a closely coiled spiral spring fitted around an insulator disc to provide an elastic deformable working periphery.

2. Welding electrodes for high frequency electric sewing machines which comprise an upper roller electrode made of a metallic disc which has a central peripheral ridge and a side portion of smaller diameter and rotatably mounted on a frame, and a lower rotating electrode comprising an annular ring of closely coiled spiral spring fitted around a circular disc of insulating material, said spiral spring having oval central bore and adjacent coils being in close contact with each other without gap along the outer periphery when the spring is fitted on said circular disc by bevelling the side of each coil of the spring along the radial direction.

3. The invention as defined in claim 1 wherein the diameter of said lower roller electrode is larger than that of said upper electrode.

4. The invention as defined in claim 2 wherein the central peripheral ridge of said upper electrode has a concave surface.

References Cited in the file of this patent

UNITED STATES PATENTS

| | | |
|---|---|---|
| 2,459,260 | Brown | Jan. 18, 1949 |
| 2,477,313 | Quayle et al. | July 26, 1949 |
| 2,525,355 | Hoyler | Oct. 10, 1950 |
| 2,583,709 | Rykert | Jan. 29, 1952 |
| 2,589,777 | Collins | Mar. 18, 1952 |

FOREIGN PATENTS

| | | |
|---|---|---|
| 647,762 | Great Britain | Dec. 20, 1950 |